(12) United States Patent
Phipps

(10) Patent No.: US 9,320,378 B2
(45) Date of Patent: Apr. 26, 2016

(54) PORTABLE STAND FOR PERSONAL ITEMS

(71) Applicant: James Matthew Phipps, Midland City, AL (US)

(72) Inventor: James Matthew Phipps, Midland City, AL (US)

( * ) Notice: Subject to any disclaimer, the term of this patent is extended or adjusted under 35 U.S.C. 154(b) by 0 days.

(21) Appl. No.: 14/597,799

(22) Filed: Jan. 15, 2015

(65) Prior Publication Data

US 2015/0196151 A1 Jul. 16, 2015

Related U.S. Application Data

(60) Provisional application No. 61/927,581, filed on Jan. 15, 2014.

(51) Int. Cl.
| | |
|---|---|
| A47G 29/08 | (2006.01) |
| F16M 11/24 | (2006.01) |
| F16M 11/04 | (2006.01) |
| A45C 11/00 | (2006.01) |
| B43M 99/00 | (2010.01) |
| B43K 23/00 | (2006.01) |
| F16M 13/00 | (2006.01) |

(52) U.S. Cl.
CPC ............... *A47G 29/08* (2013.01); *A45C 11/00* (2013.01); *B43K 23/001* (2013.01); *B43M 99/001* (2013.01); *F16M 11/04* (2013.01); *F16M 11/24* (2013.01); *F16M 13/00* (2013.01)

(58) Field of Classification Search
CPC ..... A47G 29/08; A47G 29/10; A47B 47/042; A47B 47/047; B43M 99/001
USPC .............................. 211/13.1, 85.1, 85.2, 85.9
See application file for complete search history.

(56) References Cited

U.S. PATENT DOCUMENTS

| | | | | |
|---|---|---|---|---|
| 1,757,398 | A | * 5/1930 | Squires | 108/42 |
| 1,832,801 | A | * 11/1931 | Wright | 248/165 |
| 2,930,567 | A | * 3/1960 | Lloyd-Young | 248/309.1 |
| 3,069,216 | A | * 12/1962 | Vaeth | 312/195 |
| 3,612,289 | A | * 10/1971 | Zink | 108/180 |
| 4,153,311 | A | * 5/1979 | Takahashi | 312/107 |
| 4,176,743 | A | * 12/1979 | Fitzpatrick | 206/214 |
| 4,264,013 | A | * 4/1981 | Vollmer | 211/85.2 |
| 4,562,776 | A | * 1/1986 | Miranda | 108/190 |
| 4,582,002 | A | * 4/1986 | Wright | 108/60 |
| 5,033,625 | A | * 7/1991 | Campbell | 211/85.2 |
| 5,117,989 | A | * 6/1992 | Ross | 211/144 |
| 5,454,331 | A | * 10/1995 | Green | 108/180 |
| 6,386,500 | B1 | * 5/2002 | Dainoff et al. | 248/451 |
| 6,401,946 | B1 | * 6/2002 | Chalasani et al. | 211/188 |

(Continued)

FOREIGN PATENT DOCUMENTS

| | | | |
|---|---|---|---|
| FR | 939721 | A * | 11/1948 |
| GB | 624661 | A * | 6/1949 |

*Primary Examiner* — Stanton L Krycinski

(57) ABSTRACT

A portable stand with a first board and a second board is provided. The first board includes a top surface, a bottom surface and an edge. The edge includes a first side, a second side, a top and a bottom. At least one notch is formed on the top, and a locking slot is formed on the first side. The second board includes a top surface, a bottom surface and an edge. The edge includes a first side, a second side, a top and a bottom. An opening is formed through the top surface and bottom surface in between the edge. The top surface includes a recess formed in between an inner edge, and a locking slot is formed on the second side. The locking slot of the first board and the locking slot of the second board interlock and support the first board in a substantially upright position when resting on a surface.

6 Claims, 3 Drawing Sheets

(56) References Cited

U.S. PATENT DOCUMENTS

| | | | |
|---|---|---|---|
| 6,532,878 B2 * | 3/2003 | Tidemann | 108/186 |
| 6,595,378 B2 * | 7/2003 | Wang | 211/189 |
| 6,615,996 B1 * | 9/2003 | Ivey | 211/74 |
| 6,615,999 B1 * | 9/2003 | Culp | 211/186 |
| 6,845,871 B1 * | 1/2005 | Culp | 211/186 |
| 7,114,300 B1 * | 10/2006 | Culp | 52/211 |
| 7,856,772 B1 * | 12/2010 | Culp et al. | 52/211 |
| 2001/0037987 A1 * | 11/2001 | Culp | 211/186 |
| 2008/0308508 A1 * | 12/2008 | Fischer | 211/2 |
| 2010/0093257 A1 * | 4/2010 | Elliott | 446/478 |
| 2012/0152876 A1 * | 6/2012 | Stroud | 211/153 |

* cited by examiner

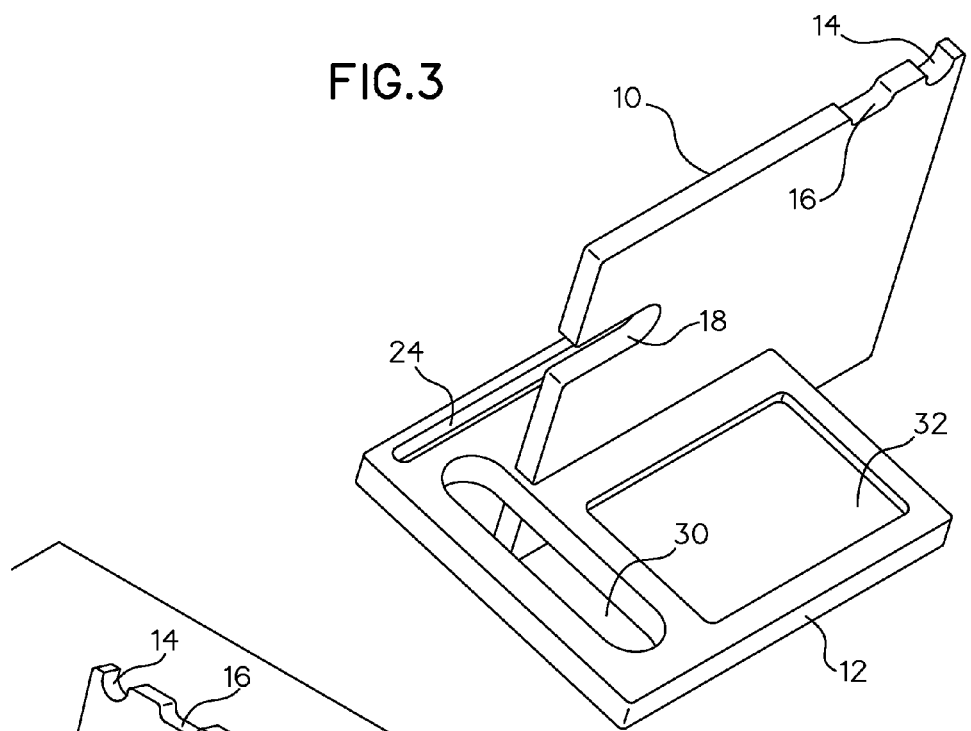
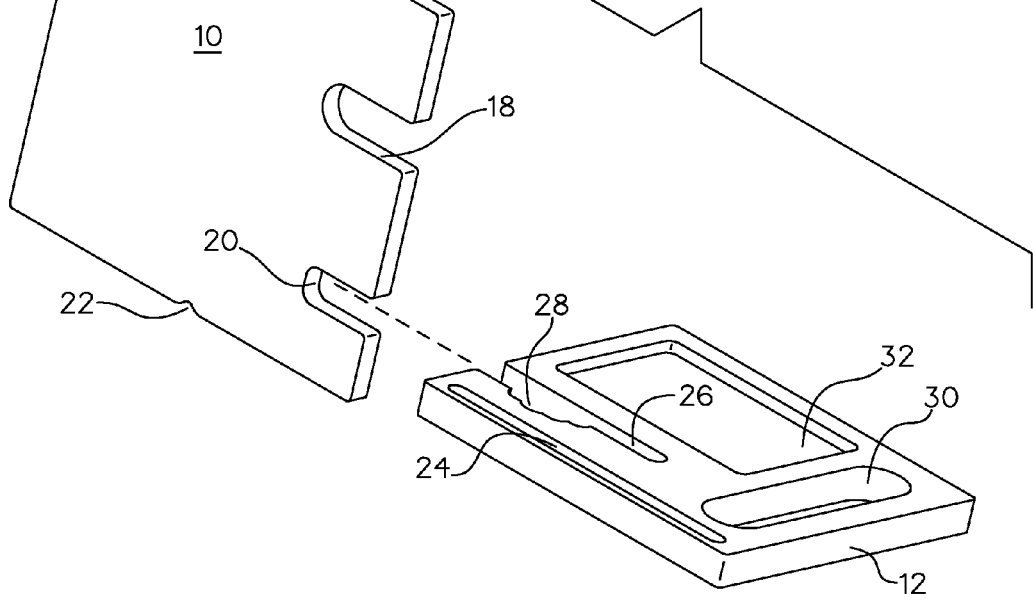

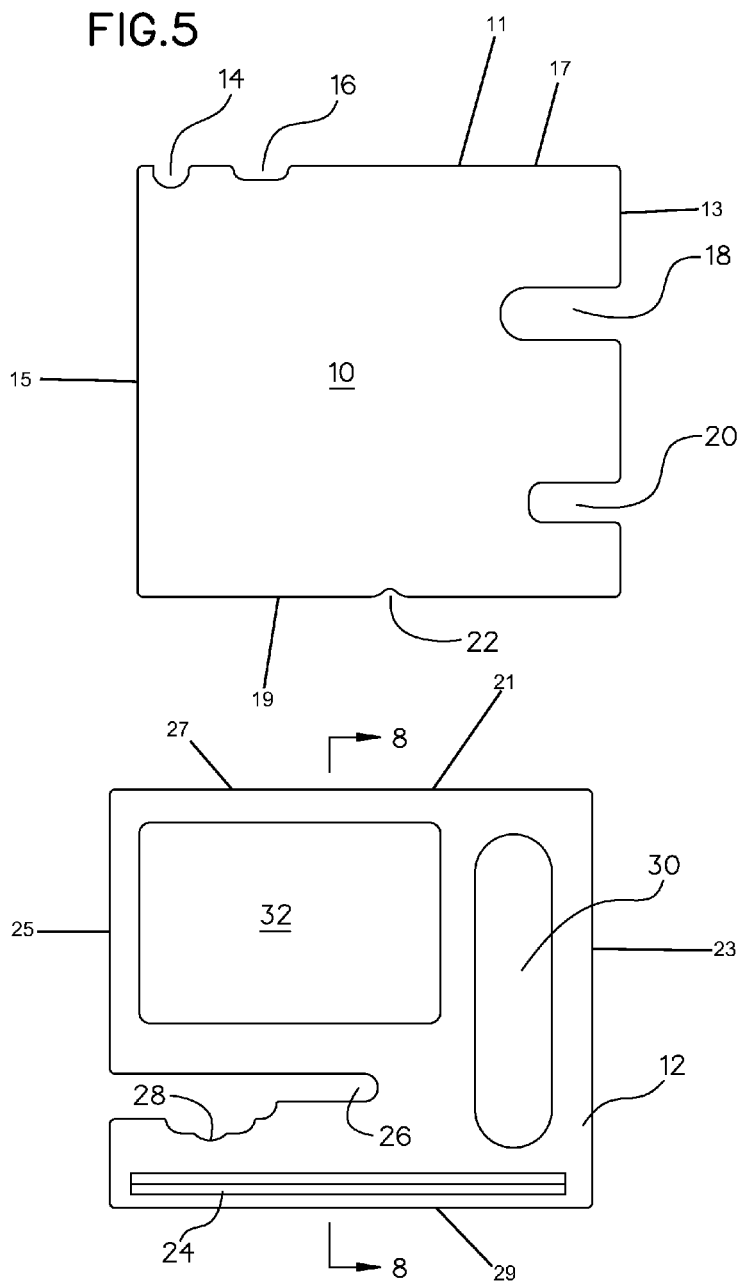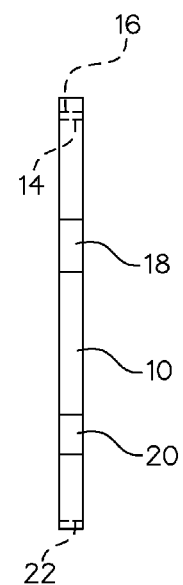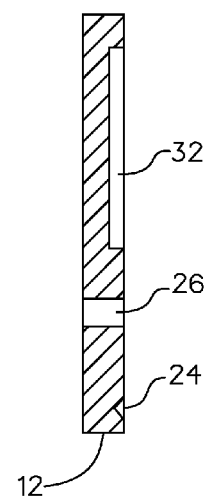

PORTABLE STAND FOR PERSONAL ITEMS

CROSS-REFERENCE TO RELATED APPLICATION

This application claims the benefit of priority of U.S. provisional application No. 61/927,581, filed Jan. 15, 2014, the contents of which are herein incorporated by reference.

BACKGROUND OF THE INVENTION

The present invention relates to a storage device for personal items and, more particularly, to a portable stand to secure personal items.

Many people tend to carry their mobile device, wallet, keys, pen, watch, eye-wear and other small items wherever they go. When people do not desire to have these items in their pockets or on their persons, these personal belongings are placed in an unorganized or undesignated location and tend to be misplaced. Also, when an electronic device is connected to its charger, the electronic device lays flat and can be difficult for viewing.

As can be seen, there is a need for a stand that holds personal items in an organized manner.

SUMMARY OF THE INVENTION

In one aspect of the present invention, a portable stand comprises: a first board comprising a top surface, a bottom surface and an edge comprising a first side, a second side, a top and a bottom, wherein at least one notch is formed on the top, and a locking slot is formed on the first side; and a second board comprising a top surface, a bottom surface and an edge comprising a first side, a second side, a top and a bottom, wherein an opening is formed through the top surface and bottom surface in between the edge, the top surface comprises a recess formed in between an inner edge, and a locking slot is formed on the second side, wherein the locking slot of the first board and the locking slot of the second board interlock and support the first board in a substantially upright position when resting on a surface.

These and other features, aspects and advantages of the present invention will become better understood with reference to the following drawings, description and claims.

BRIEF DESCRIPTION OF THE DRAWINGS

FIG. 3 is a rear perspective view of an embodiment of the present invention;

FIG. 4 is an exploded view of an embodiment of the present invention;

FIG. 5 is a top view of the first board of the present invention;

FIG. 6 is a side view of the second board of the present invention;

FIG. 7 is a top view of the first board of the present invention; and

FIG. 8 is a section view taken from 8-8 in FIG. 7

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a portable stand that holds a mobile device, wallet, wristwatch, key-chain, eye-wear, writing utensil, and coins. The present invention provides an organized place for all of the above mention items, can easily be disassembled and laid flat, and allow the mobile device to be viewed while charging. Unlike other stands for phones, this stand is designed to hold several other personal items and can be easily disassembled and lay flat for travel or storage.

The present invention can be made from solid wood, plastic, metal, stone, or other panel composite materials. The present invention can be cut with different cutting methods including hand tools. The locations of the slots, notches, grooves, and pockets can be rearranged and/or omitted to suit the user's preference.

In certain embodiments, the present invention may include a vertical piece (the first board) and a horizontal piece (the second board). The vertical piece may include a notch for hanging a key chain, a notch for eye-wear, a holder for a wristwatch or bracelet, a notch to allow an electrical cord to fit under, and a slot to fit the horizontal piece. The horizontal piece may include an opening to hold a wallet, a routed groove recess to hold a writing utensil, a routed recess for holding small items and coins, an inner edge that allows a charging cable and cell phones to be set in place while being plugged into a charger, and a narrow slot that interlocks with the vertical piece.

Slots in the present invention are defined as apertures that begin at the edges of the boards and are formed through both surfaces of the boards. Openings in the present invention are defined as apertures that are enclosed by the edges and are formed through both surfaces of the boards. Recesses in the present invention are defined as apertures formed on a surface of the boards and are not formed through both of the surfaces of the boards. Notches in the present invention are defined as apertures formed at the edges of the boards and are formed through both surfaces of the boards but are substantially smaller than the slots.

Figure 1:
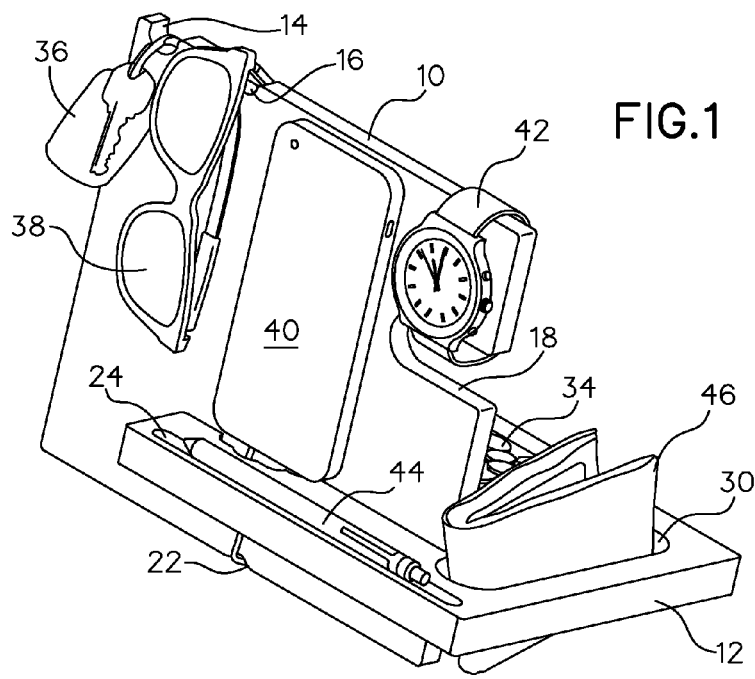
FIG. 1 is a front perspective view of an embodiment of the present invention shown in use.
Figure 2:
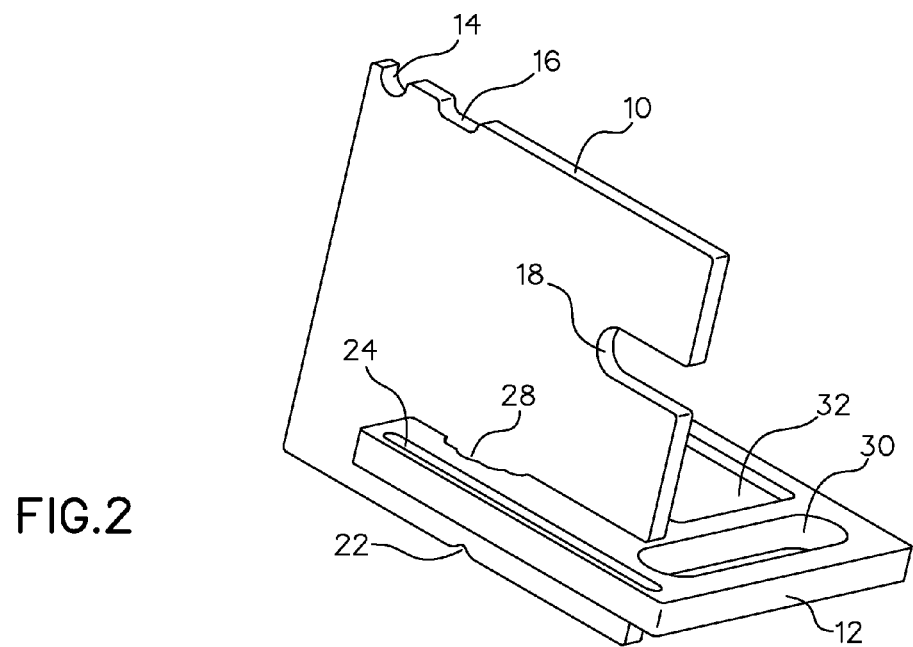
FIG. 2 is a front perspective view of an embodiment of the present invention.

Referring to FIGS. 1 through 8, the present invention includes a portable stand with a first board 10 and a second board 12. The first board 10 includes a top surface, a bottom surface and an edge 11. The edge 11 includes a first side 13, a second side 15, a top 17 and a bottom 19. At least one notch 14, 16 is formed on the top 17, and a locking slot 20 is formed on the first side 13. The second board 12 includes a top surface, a bottom surface and an edge 21. The edge 21 includes a first side 23, a second side 25, a top 27 and a bottom 29. An opening 30 is formed through the top surface and bottom surface in between the edge 21. The top surface includes a recess 32 formed in between an inner edge, and a locking slot 26 is formed on the second side 25. The locking slot 20 of the first board 10 and the locking slot 26 of the second board 32 interlock and support the first board 10 in a substantially upright position when resting on a surface.

In certain embodiments, the opening 30 is sized to receive a wallet 46. The recess 32 formed on the top surface of the second board 12 is sized to receive change 34 and other miscellaneous personal pocket materials. As mentioned above, the first board 10 and the second board 12 may interlock into an expanded and upright position while in use. The upright position may include the top 21 of the second board 12 resting on the surface and the bottom 29 of the second board 12 elevated. Therefore, a space is formed in between the surface and the bottom surface of the second board 12, so that the wallet 46 may be placed within the opening 30 and supported within. The upright position further includes the bottom 19 of the first board 10 resting on the surface and the top 17 of the first board 10 elevated and angled toward the top 21 of the second board 12. Therefore, personal goods may be draped over the top 17 within the notches 14, 16, and a phone 40 may rest against the top surface of the first board 12 in the upright position.

In certain embodiments, the top 17 of the first board 12 may include a sunglass notch 16 and a key notch 14. The sunglass notch 16 may be shaped to receive the arms of sunglasses 38 and support the sunglasses 38 on the top of the edge. The key notch 14 may be shaped to receive a key loop of keys 36 and therefore support the keys 36 on the top of the edge. In certain embodiments, a watch slot 18 may be formed on the second side in between the locking slot 20 and the top 17. The top 17 and an inner edge of the watch slot 18 may be substantially parallel and the distance between the top 17 and the watch slot 18 may allow a watch band 42 to be secured over the top 17 of the edge and through the watch slot 18, thereby securing the watch 42 to the first board 10.

In certain embodiments, the locking slot 26 of the second board 12 is formed to receive a phone charger plugged into a phone 40. As illustrated in the Figures, the locking slot 26 of the second board 12 includes an edge 28 shaped to receive the phone charger within. In such embodiments, the first board 10 may include a wire notch 22 formed on the bottom 19. The wire notch 22 aligns with the phone charger shaped edge 28 when the first board 10 and the second board 12 are interlocked. Therefore, a user may rest their phone 40 against the first board 10 in the upright position, and plug there phone 40 into the phone charger. The phone charger may be secured within the phone charger shaped edge 28 and the wire may run from the phone charger and underneath the wire notch 22 unimpeded.

In certain embodiments, the present invention may further include an elongated recess 24 formed on the top surface of the second board 12. The elongated recess 24 is sized to receive and secure a writing utensil 44, such as a pen or pencil. The elongated recess 24 may be formed in between the locking slot 26 and the bottom 29 of the second board 12.

While traveling or storing the present invention, the first board 10 and the second board 12 may be stacked flat against one another. When in use, the locking slot 20 of the first board 10 may be inserted into the locking slot 26 of the second board 12. The portable stand may then be in the upright and expanded position, ready for use. A user may place change 34 within the recess 32, their wallet 46 within the opening 30, a pen within the elongated recess 24, lean their phone 40 against the first board 10, place a watch around the watch slot 18 and top 17 edge, place their sunglasses 38 in the sunglass notch 16, and place their key ring in the key notch 14. The personal accessories of the user are now organized and easy to find.

It should be understood, of course, that the foregoing relates to exemplary embodiments of the invention and that modifications may be made without departing from the spirit and scope of the invention as set forth in the following claims.

What is claimed is:

1. A portable stand comprising:
    a first board comprising a top surface, a bottom surface and an edge comprising a first side, a second side, a top and a bottom, wherein at least one notch is formed on the top, and a locking slot is formed on the first side; and
    a second board comprising a top surface, a bottom surface and an edge comprising a first side, a second side, a top and a bottom, wherein an opening is formed through the top surface and bottom surface in between the edge, the top surface comprises a recess formed in between an inner edge, and a locking slot is formed on the second side,
    wherein the locking slot of the first board and the locking slot of the second board interlock and support the first board in a substantially upright position when resting on a surface,
    wherein the upright position comprises the top of the second board resting on the surface and the bottom of the second board elevated, and the bottom of the first board resting on the surface and the top of the first board elevated,
    wherein the locking slot of the second board comprises an inner edge comprising notches formed to receive a phone charger when the phone charger is plugged into a phone that is resting on the first board in the upright position.

2. The portable stand of claim 1, wherein the at least one notch formed on the top of the first board comprises a sunglass notch and a key notch.

3. The portable stand of claim 1, wherein the first board further comprises a watch slot formed on the first side in between the locking slot and the top.

4. The portable stand of claim 1, wherein the first board comprises a wire notch formed on the bottom, wherein the wire notch aligns with the notches formed to receive the phone charger when the first board and the second board are interlocked.

5. The portable stand of claim 1, wherein the second board further comprises an elongated recess formed on the top surface and sized to receive and secure a writing utensil, wherein the elongated recess is formed in between the locking slot and the bottom.

6. The portable stand of claim 1, wherein the upright position further comprises the first board angled towards the top of the second board.

* * * * *